United States Patent [19]

Nagler

[11] 4,400,065
[45] Aug. 23, 1983

[54] MULTI-PURPOSE TELESCOPE

[76] Inventor: Albert Nagler, 15 Green Hill La., Spring Valley, N.Y. 10977

[21] Appl. No.: 264,225

[22] Filed: May 18, 1981

[51] Int. Cl.³ .................... G02B 11/12; G02B 23/00
[52] U.S. Cl. ................................. 350/476; 350/450; 350/457; 350/480; 350/537
[58] Field of Search .............. 350/450, 476, 480, 457

[56] References Cited

U.S. PATENT DOCUMENTS 2,500,046  3/1950  Schade ............................... 350/476

FOREIGN PATENT DOCUMENTS 4756 of 1878  United Kingdom ............... 350/480
209371  1/1924  United Kingdom ............... 350/476

*Primary Examiner*—John K. Corbin
*Assistant Examiner*—Rebecca D. Gass
*Attorney, Agent, or Firm*—William P. Keegan

[57] ABSTRACT

A multi-purpose telescope objective having a Petzval type lens configuration and including an iris diaphragm.

3 Claims, 4 Drawing Figures

U.S. Patent    Aug. 23, 1983    4,400,065
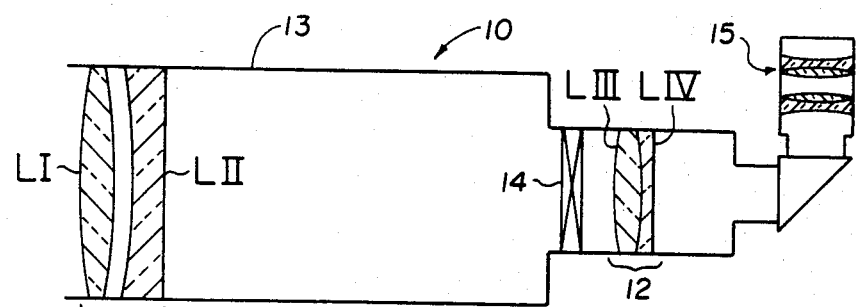
FIG.1
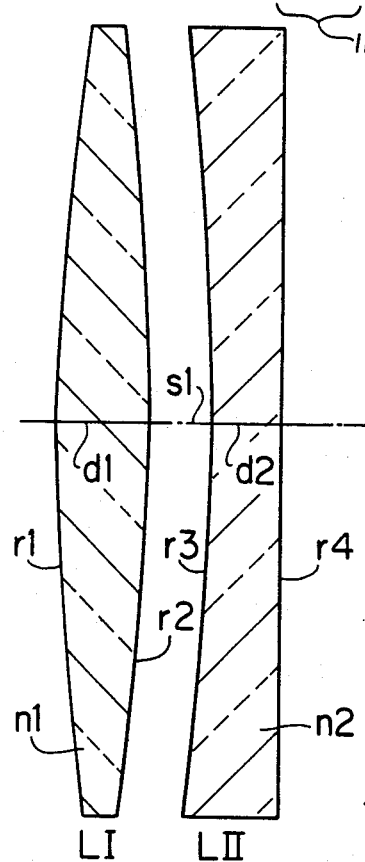
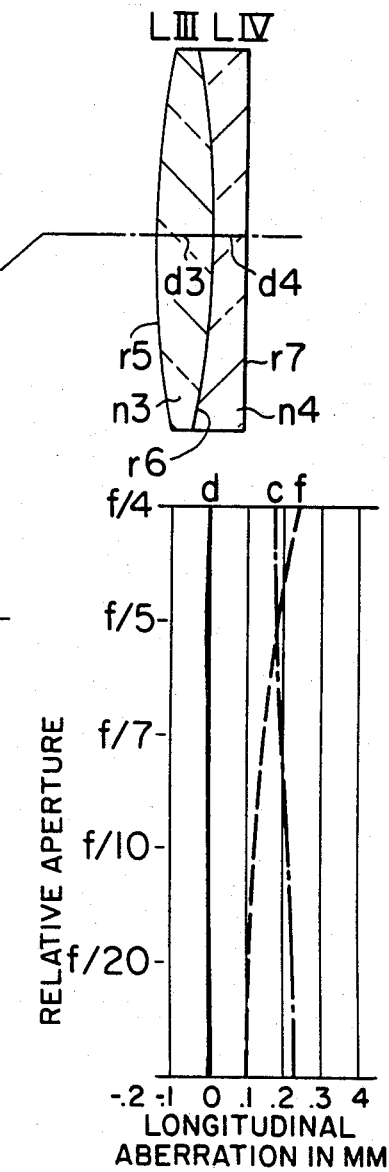
FIG.2
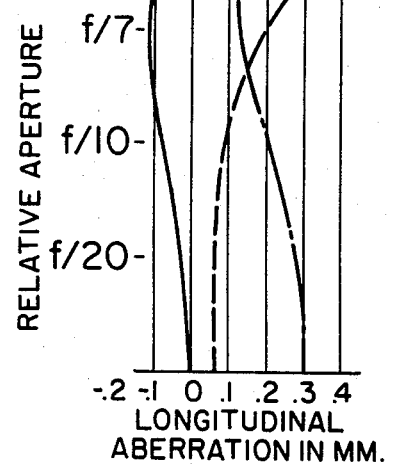
FIG.4              FIG.3

MULTI-PURPOSE TELESCOPE

BACKGROUND OF THE INVENTION

Refractor telescopes having air-spaced doublet objectives perform well with an f/5 relative aperture when used for low power purposes. However, at high power, they are limited by zonal spherical aberration and secondary chromatic aberration. The latter results in a purple fringe due to the fact that the common blue-red focus does not coincide with the yellow-green focus. These aberrations encountered at high power usage can be minimized by providing a relatively small relative aperture, e.g. f/10, or by using very expensive glass types for the lens elements.

SUMMARY OF THE INVENTION

This invention relates to refractor telescopes and more particularly to a multi-purpose telescope employing a Petzval type lens for the objective.

It is the object of the present invention to provide a refractor telescope which has improved secondary color correction, minimal zone spherical aberration, and minimal sphero-chromatism, the latter being a chromatic variation of spherical aberration.

It is a further object of the invention to provide a refractor telescope which performs better with an f/4 relative aperture than a telescope employing an air-spaced doublet with an f/5 relative aperature when the same type glass is used in both.

It is still another object of the invention to provide a multi-purpose refractor telescope which can be used for low power wide angle views, or high power high resolution views, or for photographic purposes.

In carrying out the invention, a telescope is provided having a Petzval type lens for the objective and an iris diaphragm located adjacent the rear achromat of the objective.

Features of the invention: the ability to adjust the exit pupil so as to match the telescope aperture to air turbulence conditions and thereby optimize image resolution; minimizing residual secondary spectrum which otherwise might be annoying when viewing very bright objects; easy control of image brightness; and the ability to adjust the exit pupil to avoid the most aberrated portion of the observer's eye and thereby improve his visual acuity.

Other features of the invention may be gained from the foregoing and from the description of a preferred embodiment of the invention which follows.

BRIEF DESCRIPTION OF THE DRAWING

FIG. 1 is a schematic illustration of a telescope according to the present invention;

FIG. 2 is a schematic section of the telescope objective;

FIG. 3 is a graph showing longitudinal aberrations in the f/4 Petzval type objective disclosed herein; and FIG. 4 is a graph showing longitudinal aberrations in a prior art f/5 air-spaced doublet objective.

DETAILED DESCRIPTION OF THE INVENTION

A telescope 10 constructed according to the present invention is shown schematically in FIG. 1. The objective lens comprises a pair of spaced achromatics 11 and 12 mounted in the telescope barrel 13. An iris diaphragm 14 is provided, and while it may be placed anywhere between the two achromats, it preferably is located adjacent achromat 12. In this position it will be the smallest and least expensive commensurate with its mechanical design, and it will be conveniently located for adjustment by an observer peering through the eyepiece 15 of the telescope. Neither the eyepiece nor the specific configuration of the iris diaphragm form any part of the present invention, hence they are shown schematically and not in detail.

The telescope objective, shown in more detail in FIG. 2, is a Petzval type lens. It comprises two widely spaced achromats 11 and 12 having an effective focal length that is appreciably shorter than the physical length of the objective measured from the front vertex of achromat 11 to the focal plane of the lens. Thus, the telescope objective having the parameters hereinafter set forth will have an effective focal length of 508.6 mm. and an overall length of approximately 755 mm.

The front achromat 11 includes lens elements LI and LII, while the rear achromat 12 includes lens element LIII and LIV. Lens elements LI and LIII are made of BK-7 glass having a refractive index of 1.5168 and an Abbe number of 64.2. Lens elements LII and LIV are made of SF-12 glass having a refractive index of 1.6477 and an Abbe number of 33.8. All air-glass surfaces are preferably provided with an anti-reflective coating.

The lens elements for an f/4 relative aperture Petzval type lens will have the following parameters where the radii, lens thicknesses and separations, clear apertures, and outside diameters are given in millimeters.

| Lens Element | Radii | Lens Thickness "d" | Lens Separation "s" | Clear Aperture | Outside Diameter |
|---|---|---|---|---|---|
| LI | r1 = +411.43<br>r2 = −544.15 | d1 = 16.0 | | 126 | 132 |
| | | | s1 = 6.0 | | |
| LII | r3 = −501.7<br>r4 = −6890.0 | d2 = 12.0 | | 126 | 132 |
| | | | s2 = 480.0 | | |
| LIII | r5 = +253.263<br>r6 = −253.263 | d3 = 8.0 | | 60 | 64 |
| | | | s3 = 0.0 | | |
| LIV | r6 = −253.263<br>r7 = −1386.0 | d4 = 8.0 | | 60 | 64 |

In FIG. 3, the longitudinal chromatic aberration of the Petzval lens shown in FIG. 2 is conventionally plotted to show the focal point deviation, in millimeters, for the three wavelengths specified by the c, d, and f Fraunhofer lines. When compared to the aberration of an f/5 air-spaced doublet, shown in FIG. 4, it is seen that the f/4 objective of the present invention compares very favorably with the f/5 doublet. Moreover, the chromatic aberration is relatively flat over the full range of relative apertures, thereby providing excellent resolution and color correction at any iris setting. It is further noted that, for photographic purposes, the Petzval objective has been optimized for 35 mm. film format.

Having thus described the invention, it is clear that what may appear to be other embodiments could be provided without departing from the spirit and scope of the invention. Thus, other Petzval type objectives having different parameters could be provided. For exam- ple, lens 11 could be cemented, or both achromats could be air-spaced, or cemented. Hence it is intended that the foregoing specification and the accompanying drawing be interpreted as illustrative rather than in a limiting sense.

What is claimed is:

1. A multi-purpose telescope comprising a Petzval type objective having a front achromat and a rear achromat widely spaced from each other, and an iris disphragm located between said achromats and proximate to said rear achromat, and wherein said Petzval type objective includes lens elements LI and LIII made of BK-7 glass having a refractive index of 1.5168 and an Abbe number of 64.2 and lens elements LII and LIV made of SF-12 glass having a refractive index of 1.6477 and an Abbe number of 33.8 and said lens elements have the parameters specified in the following table wherein all dimensions are given in millimeters:

| Lens Element | Radii | Lens Thickness "d" | Lens Separation "s" | Clear Aperture | Outside Diameter |
|---|---|---|---|---|---|
| LI | r1 = +411.43 | d1 = 16.0 | | 126 | 132 |
| | r2 = −544.15 | | | | |
| | | | s1 = 6.0 | | |
| LII | r3 = −501.7 | d2 = 12.0 | | 126 | 132 |
| | r4 = −6890.0 | | | | |
| | | | s2 = 480.0 | | |
| LIII | r5 = +253.263 | d3 = 8.0 | | 60 | 64 |
| | r6 = −253.263 | | | | |
| | | | s3 = 0.0 | | |
| LIV | r6 = −253.263 | d4 = 8.0 | | 60 | 64 |
| | r7 = −1386.0 | | | | |

2. A Petzval type objective including lens elements LI, LII, LIII, and LIV wherein lens elements LI and LIII are made of BK-7 glass having a refractive index of 1.5168 and an Abbe number of 64.2 and lens elements LII and LIV are made of SF-12 glass having a refractive index of 1.6477 and an Abbe number of 33.8, and wherein said lens elements have the parameters specified in the following table where all dimensions are given in millimeters:

| Lens Element | Radii | Lens Thickness "d" | Lens Separation "s" | Clear Aperture | Outside Diameter |
|---|---|---|---|---|---|
| LI | r1 = +411.43 | d1 = 16.0 | | 126 | 132 |
| | r2 = −544.15 | | | | |
| | | | s1 = 6.0 | | |
| LII | r3 = −501.7 | d2 = 12.0 | | 126 | 132 |
| | r4 = −6890.0 | | | | |
| | | | s2 = 480.0 | | |
| LIII | r5 = +253.263 | d3 = 8.0 | | 60 | 64 |
| | r6 = −253.263 | | | | |
| | | | s3 = 0.0 | | |
| LIV | r6 = −253.263 | d4 = 8.0 | | 60 | 64 |
| | r7 = −1386.0 | | | | |

3. A telescope comprising a Petzval type objective according to claim 2 an iris diaphragm located between lens elements LII and LIII and proximate to lens element LIII, and an eyepiece.

* * * * *